(12) United States Patent
Simon et al.

(10) Patent No.: US 7,154,510 B2
(45) Date of Patent: Dec. 26, 2006

(54) SYSTEM AND METHOD FOR MODIFYING A PORTRAIT IMAGE IN RESPONSE TO A STIMULUS

(75) Inventors: Richard A. Simon, Rochester, NY (US); John R. Squilla, Rochester, NY (US); Dale F. McIntyre, Honeyoe Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 108 days.

(21) Appl. No.: 10/294,332

(22) Filed: Nov. 14, 2002

(65) Prior Publication Data

US 2004/0095359 A1 May 20, 2004

(51) Int. Cl.
G09G 5/00 (2006.01)
(52) U.S. Cl. ............ 345/619; 345/589; 345/629; 345/634; 345/646
(58) Field of Classification Search ............ 345/619, 345/589, 629, 634, 646
See application file for complete search history.

(56) References Cited

U.S. PATENT DOCUMENTS

| | | | |
|---|---|---|---|
| 5,367,454 A | | 11/1994 | Kawamoto et al. |
| 5,612,716 A | * | 3/1997 | Chida et al. ............ 345/630 |
| 5,987,104 A | * | 11/1999 | Tomimori ............ 379/93.23 |
| 6,147,692 A | | 11/2000 | Shaw et al. |
| 6,175,772 B1 | * | 1/2001 | Kamiya et al. ............ 700/31 |
| 6,268,857 B1 | * | 7/2001 | Fishkin et al. ............ 345/863 |
| 6,345,111 B1 | * | 2/2002 | Yamaguchi et al. ........ 382/118 |
| 6,507,351 B1 | * | 1/2003 | Bixler ............ 345/810 |
| 6,556,775 B1 | * | 4/2003 | Shimada ............ 386/121 |
| 6,731,302 B1 | * | 5/2004 | Cote ............ 345/619 |
| 2002/0018076 A1 | | 2/2002 | Carcua et al. |
| 2004/0032434 A1 | * | 2/2004 | Pinsky et al. ............ 345/814 |

FOREIGN PATENT DOCUMENTS

WO WO 01/01353 1/2001

OTHER PUBLICATIONS

Microsoft Windows NT, 1998, pp. 1-8.*
Galt Technology, pp. 1-4.*
Newspaper Article "Frame photos electronically", Democrat & Chronicle Newspaper, Sunday, Nov. 3, 2002.
Synthesizing Realistic Facial Expression from Photographs by Pigin, et al, SIGGRAPH 98, Computer Graphics Proceedings, Annual Conference series, 1998, pp. 75-83.
"You've Got Face", Time, Apr. 2, 2001, p. 77.
A Morphable Model for the Synthesis of 3d Faces, Volker Blanz and Thomas Vitter, Max Planck Institute, SIGGRAPH Computer Graphics Proceeding Annual Conf. Series, 1999, pp. 187-194.
A Muscle Model for Animating Three-dimensional Facial Expression—Computer Graphics, vol. 21, 1987 (SIGGRAPH 1987) pp. 17-24, Jul. 1987 by Waters.
Realistic Face Modeling and Animation, Computer Graphics (SIGGRAPH 1995),pp. 55-62, Aug. 1995, Lee et al.

(Continued)

*Primary Examiner*—Kee M. Tung
*Assistant Examiner*—Mike Rahmjoo
(74) *Attorney, Agent, or Firm*—Susan L. Parulski

(57) ABSTRACT

A system and method of modifying a portrait image. The method comprises the steps of: sensing a stimulus; selecting at least one modification in response to the sensing the stimulus; mapping the selected at least one modification to the first portrait image to generate a second digital still portrait image; and displaying, on the display, the second portrait image.

35 Claims, 13 Drawing Sheets

OTHER PUBLICATIONS

Arad, et al, Image Warping by Radial Basis Functions: Applications to Facial Expressions, CBGIP—Graphical Models & Imaging Processing, vol. 56, No. 2 Mar. 1994, pp. 161-172.

Cosatto, et al,—Sample Based Synthesis of Photo Realistic Talking Heads, In the Proceedings of Computer Animation, pp. 103-110, 1998.

"Making Faces" by Guenter et al, Computer Graphics (SIGGRAPH 1998), pp. 55-56, Aug. 1998.

Lanitis, et al, Automatic Interpretation and Coding of Faces Images using Flexible Models, IEEE Trans, Of PAMI, vol. 19, No. 7, pp. 743-756, 1997.

Yan Guo et al., Avatar Control by Facial Expressions, 2001 IEEE International Fuzzy Systems Conference, pp. 1351-1354.

Frederic Pighin et al., Synthesizing Realistic Facial Expressions From Photographs, Computer Graphics, Siggraph 98 Conference Proceedings, Jul. 1998, pp. 75-84.

* cited by examiner

| | | | | | | |
|---|---|---|---|---|---|---|
| EMOTION | HAPPY | | SAD | | CALM | |
| | SURPRISED | | ANGRY | | SLEEPY | |
| | FORGETFUL | | THOUGHTFUL | | | |
| FACIAL FEATURE | NOSE | SIZE | OPEN | CLOSE | OPEN | CLOSE |
| | | POSITION | RIGHT EYE | | LEFT EYE | |
| | | SHAPE | | | | |
| | MOUTH | OPEN | CHIN | | FOREHEAD | |
| | | CLOSE | | | | |
| | | | | | | |
| | LEFT CHEEK | | RIGHT CHEEK | | | |
| AGE | YOUNGER | | OLDER | | | |
| WEIGHT | LOSS | | GAIN | | | |
| HAIR | LOSS | | GAIN | | | |
| POSE | HAND | RT. UP DN | FACE | TILT | | |
| | | LT. UP DN | | NOD | | |

FIG. 6

| STIMULUS | CATEGORY | MODIFICATION |
|---|---|---|
| • SOUND | • ALARMING SOUND (INCLUDING: LARGE AMPLITUDE SHARP HIGH FREQUENCY) | SURPRISE RELAXATION SMILE SADNESS |
| | • SOOTHING SOUNDS | SMILE |
| • TIME | RANDOM | SLIGHT MOTION BLINK |
| • LIGHT | • WAKING | ANTICIPATION |
| | • TRANSITION TO AWAKE | HEAD TILT ALERT BLINK |
| | • TRANSITION TO SLEEP | EYES CLOSED RELAXATION |
| | • FLASHING LIGHTS | SURPRISE |
| • VOICE | • VOICE RECOGNITION | SMILE/BLINK |
| • OBJECT RECOGNITION | FAMILIAR PERSON | SMILE |
| • TIME OF YEAR | WINTER ANNIVERSARY | CHILL, COLD SMILE, HAPPY |
| • NUMBER OF PEOPLE | WIDE ANGLE | MOVE HEAD TO SEE ALL PEOPLE |

*FIG. 11*

SYSTEM AND METHOD FOR MODIFYING A PORTRAIT IMAGE IN RESPONSE TO A STIMULUS

CROSS REFERENCE TO RELATED APPLICATIONS

Reference is made to pending application U.S. Ser. No. 10/179,435 titled "APPARATUS AND METHOD OF MODIFYING A PORTRAIT IMAGE", by inventors Squilla et al, filed on Jun. 25, 2002, commonly assigned.

FIELD OF THE INVENTION

The present invention relates generally to the field of digital imaging, and more particularly, to a system and method for modifying a portrait image.

BACKGROUND OF THE INVENTION

Portrait images are a popular type of photograph/image taken by both professional photographers and amateur photographers. These portrait images typically show a head and shoulder portrait of one or more individuals. For example, portrait images are popular for school year books and graduation pictures. These photographs are displayed in many locations—including at home and at the office—and can generate emotional memories such as a happy memory. Yet, the photograph is a still image, so is therefore a static presentation of the subject. In some situations, the viewer may wish that the subject of the photograph not be static, that is, that the subject move or change so that the viewer sees different images of the subject so as to make the subject "come alive".

Accordingly, a need exists for a method of generating and displaying a non-static portrait image from a static portrait image. That is, a "living portrait". Such a living portrait can provide personality and expression to the subject of the portrait to make the subject "come alive" for the viewer in response to a physical/external stimulus.

U.S. Pat. No. 5,367,454 (Kawamoto) relates to an interactive man-machine interface for simulating human emotions. More particularly, Kawamoto relates to an emotion emulator for producing pseudo-emotions of an artificial agent in an interactive input/output system so as to make the agent behave more like a human and realize natural interaction. Kawamoto senses an emotional state of the user, which is then reacted to by the machine. As such, Kawamoto is directed to an interaction, and Kawamoto is not directed to a method responsive to a physical stimulus.

The present invention provides a method for generating a living portrait, such that the portrait is not a static representation of a subject. The living portrait can react or be responsive to a physical stimulus.

SUMMARY OF THE INVENTION

An object of the present invention is to provide an apparatus and method for modifying a portrait image displayed on a display disposed in a display area.

Another object of the invention is to provide such a method which is responsive to a stimulus.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a method for modifying a first digital still portrait image displayed on a display disposed in a display area. The method comprises the steps of: sensing a physical stimulus; selecting at least one modification from a plurality of pre-defined modifications in response to the sensing of the physical stimulus; mapping the selected at least one modification to the first portrait image to generate a second digital still portrait image; and displaying, on the display, the second portrait image.

According to another aspect of the invention, there is provided a method of modifying a digital still portrait image. The method comprises the steps of: (a) providing a plurality of pre-defined modifications; (b) displaying, on a display in a display area, the portrait image; (c) sensing a physical stimulus; (d) selecting at least one of the plurality of pre-defined modifications in response to the sensing of the stimulus; (e) generating a modified portrait image using the selected at least one of the plurality of pre-defined modifications; and (f) displaying, on the display, the modified portrait image.

According to yet another aspect of the invention, there is provided a method of modifying a digital still portrait image. The method comprises the steps of: (a) generating an image model of the portrait image; (b) providing a plurality of modified portrait images generated by applying a plurality of pre-defined modifications to the image model; (c) displaying, on a display in a display area, the portrait image; (d) sensing a physical stimulus; (e) selecting at least one of the plurality of modified portrait images in response to the stimulus; and (f) displaying, on the display, the selected at least one of the plurality of modified portrait images.

According to yet still another aspect of the invention, there is provided a method of displaying a plurality of images on a display located in a display area. The method comprises the steps of: displaying a first digital still portrait image on the display; determining a predetermined period of time; selecting at least one modification from a plurality of pre-defined modifications and mapping the selected at least one modification to the first digital still portrait image to generate a second digital still portrait image; determining a transitory modification and mapping the selected transitory modification to the first portrait image to generate a transitory digital still portrait image; displaying on the display, prior to the elapse of the predetermined time, the transitory digital still portrait image; and displaying on the display, in response to the elapse of the predetermined time, the second digital still portrait image.

According to a further aspect of the invention, there is provided an image display for displaying a plurality of digital still portrait images. The image display comprises: a sensing member for sensing a physical stimulus; a storage device for storing a plurality of pre-defined modifications; a processor for categorizing the sensed stimulus, selecting at least one modification from the plurality of pre-defined modifications in response to the sensing of the physical stimulus, and mapping the selected at least one modification to a first portrait image to generate another digital still portrait image; and an image display for displaying the another digital still portrait image generated in response to the sensing of the stimulus.

According to another aspect of the invention, there is provided a system for displaying a plurality of digital still portrait images to simulate a living portrait. The system comprises: (a) an image display located at a first location, the image display including a display area for displaying, individually, each of the plurality of digital still portrait images; (b) a remote device disposed at a location remote from the first location and including either a sensing member for sensing a physical stimulus at the remote location or a receiving member for receiving a stimulus at the remote location; (c) a communication network for providing communication between the image display and the remote device; (c) a storage device for storing a plurality of pre-defined modifications; and (d) a processor for receiving and categorizing the stimulus from the remote device, selecting at least one modification from the plurality of pre-defined modifications in response to the sensing of the physical stimulus, mapping the selected at least one modification to a first portrait image to generate another digital still portrait image, wherein the generated another digital still portrait image is displayed on the image display.

The present invention provides a method for generating a living portrait, such that the portrait is not a static representation of a subject. The living portrait reacts to or is responsive to a stimulus.

BRIEF DESCRIPTION OF THE DRAWINGS

The foregoing and other objects, features, and advantages of the invention will be apparent from the following more particular description of the preferred embodiments of the invention, as illustrated in the accompanying drawings.

FIG. 6 shows a list of pre-defined modifications.

FIG. 11 shows a table of possible categorization of sensed stimulus and candidate modifications.

DETAILED DESCRIPTION OF THE INVENTION

Figure 1:
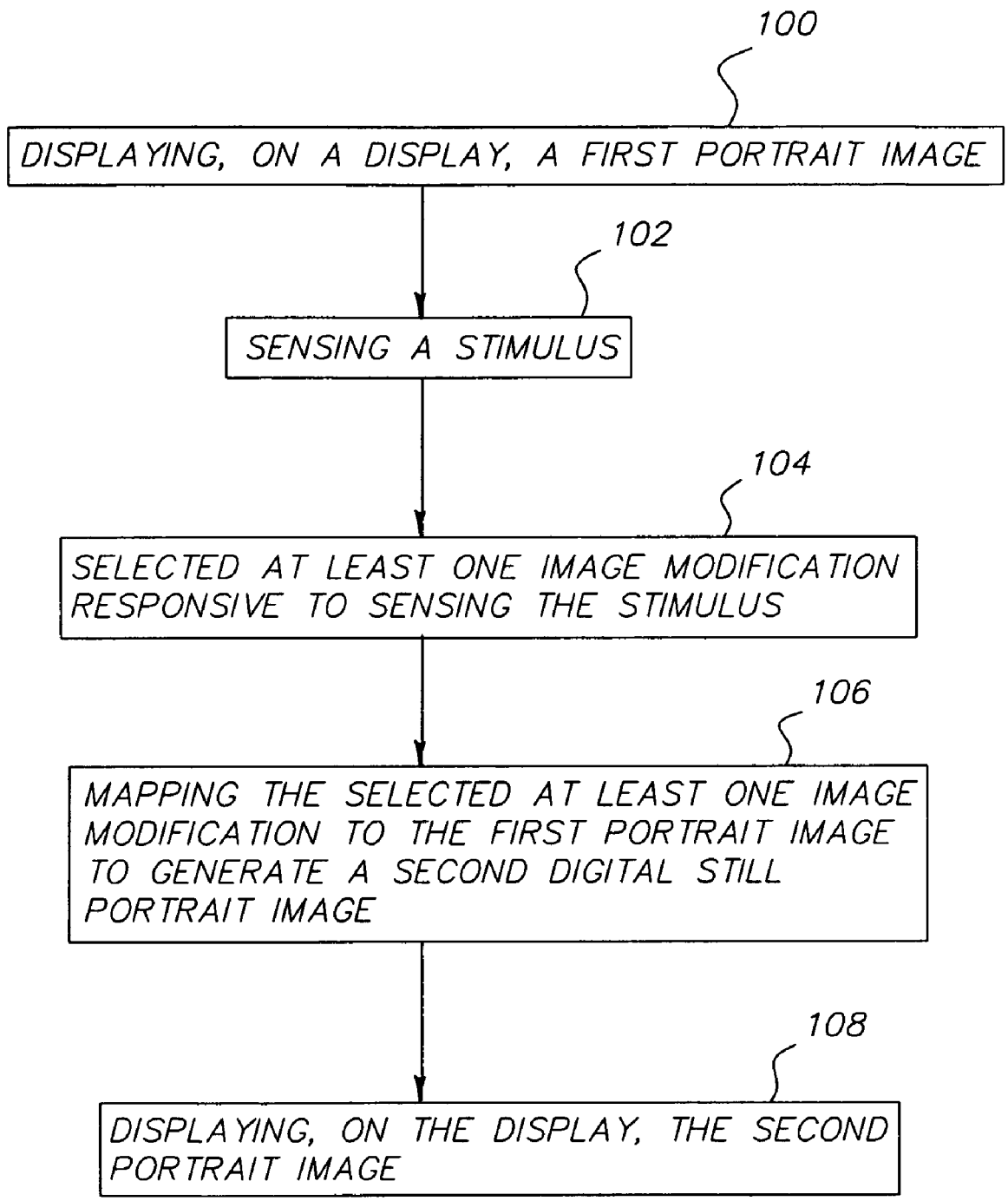
FIG. 1 shows a flow diagram illustrating a method in accordance with a first embodiment of the present invention.

The following is a detailed description of the preferred embodiments of the invention, reference being made to the drawings in which the same reference numerals identify the same elements of structure in each of the several figures.

For purposes of the present application, the term "portrait" or "portrait image" refers to a likeness of a person or animal, especially one showing the face, as of a painting, drawing, photograph, rendering or the like. A rendering can take the form of a cartoon or be artificially generated, such as by means of a computer. As such, the term "portrait" encompasses an image comprising a representation of one or more faces, including human/person or animal. The term further comprises any/all related elements, for example, portrait effects, accessory, and/or features, such as a hat, hair, gloves, glasses, or the like.

Also, for purposes of the present application, the term "modification" refers to any change which could occur to the portrait, including, but not limited to a change in expression, emotion, facial features (ex: blue eyes to green eyes, or brunette to blond), age (e.g., younger and older), weight (e.g., loss and gain), hair (e.g., loss and gain), texture (including texturing of skin and color), lighting, and pose (e.g., movement, for example, changing from a frontal view to a side view). Accordingly, a modification can comprise a change in expression (for example, several different smiles of happiness), and a change in emotion (for example, happiness, joy, sorrow, hate). A modification can further comprise a change resulting from weight loss, weight gain, aging, and youth rejuvenation. Still further a modification can comprise a change in a facial feature, for example, blue eyes to green eyes, blond to brunette. Yet further, changes in head size/shape, eye size/shape, nose size/shape, ear size/shape, and lip size/shape. Yet still further, a modification can comprise a tilt, rotation, or other movement of the facial image. Further, a modification can comprise a pose change of the subject or the movement of the body of the subject, such as a movement of an arm or shoulder. Modification may also comprise clothing color change, as it may be desired to better match the background or compliment the clothing of another person. Modification may also comprise an accessory change, for example, a change in hat color, or the addition/removal of jewelry or glasses.

In addition, the term "stimulus" refers to something that rouses or incites a modification. For example, a stimulus can be a situation, event, change, time change, audio/sound, temperature, or the like. A physical stimulus is a stimulus which pertains to matter or energy (i.e., non-emotional). Examples of physical stimulus include, but are not limited to, motion, light, audio/sound, time, temperature, and an environmental event/change. A specific example of a physical stimulus is the ambient light of a room changing such as from a lamp being turned on. Another specific example is a change in the ambient temperature of a room. A further specific example is the sound of a person talking after a moment of silence, or a person changing the tone of voice from a low tone to a higher tone. A further specific example is the elapse of time. A still further example is a sound of rain.

The present invention provides an apparatus and method of modifying a portrait image to provide a living portrait. In a preferred embodiment, a stimulus directly influences at least one modification of at least one subject in a portrait image. The present invention provides an apparatus and method of modifying a portrait image of a person, although the present invention may be extended to other portrait images, such as dogs, cats, cartoon characters, and the like.

A flow diagram of a method in accordance with a first embodiment of the present invention is shown in FIG. 1, with each of the steps illustrated in FIG. 1 being more particularly described below. The method diagrammed in FIG. 1 is directed to a method for modifying a portrait image. The portrait image is a digital still image, and is displayed on a display disposed in a display area (step 100). A physical stimulus is sensed (step 102). At step 104, at least one modification is selected responsive to sensing the stimulus. The selected at least one modification is mapped to the portrait image to generate a second digital still portrait image (step 106). As indicated above, the modification can relate to aging, pose, expression, emotion, texture, weight, beauty, non-photo realistic effects, eye movement, hair loss or gain, or the like. The second portrait image is then displayed on the display (step 108). Steps 102 through 106 can be repeated to generate further portrait images (i.e., a third portrait image, a fourth portrait image, a fifth portrait image, and so forth), which can then each be displayed on the display at step 108.

Figure 2:
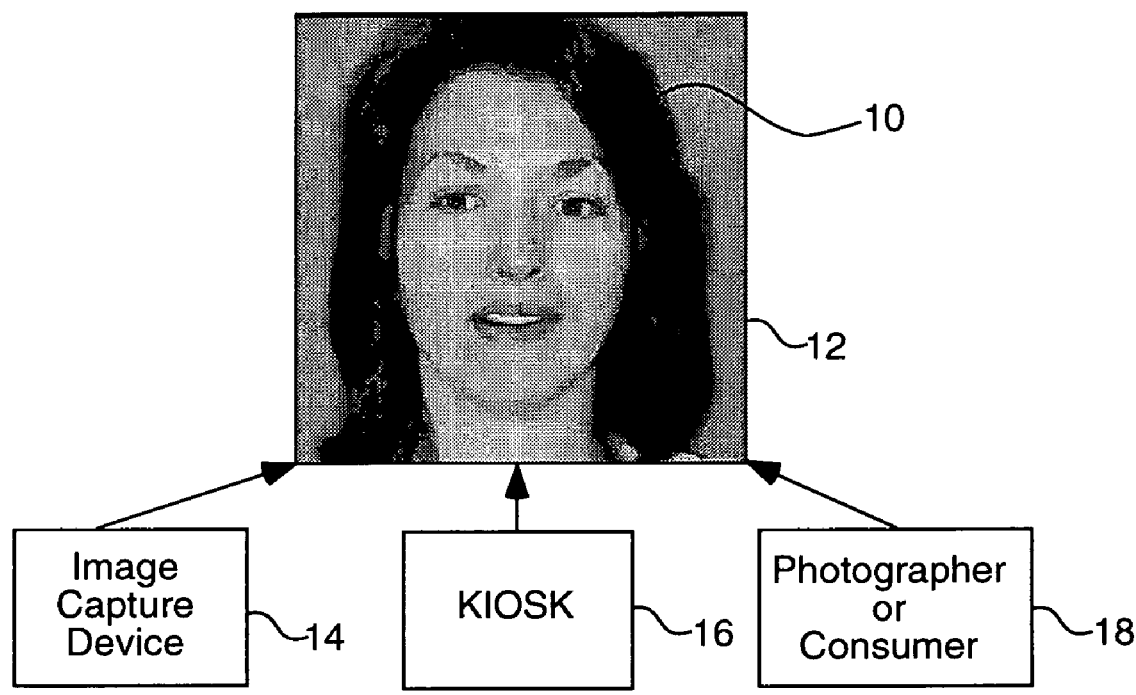
FIG. 2 shows a first portrait image.

An example of a digital still image 12 is illustrated in FIG. 2 as comprising a first portrait image 10. As shown in FIG. 2, first portrait image 10 includes a frontal view of a person's face, with the person being a sole subject of digital still image 12.

Still referring to FIG. 2, digital still image 12 can be provided using known methods/techniques, for example, an image capture device 14, an imaging producing kiosk 16, or a photographer/consumer 18.

Digital still image 12 can be captured using image capture device 14. Known image capture devices include photographic film cameras, digital cameras, digital video recorders, and camcorders. If image capture device 14 is a device which captures the image in digital form, such as a digital camera, first portrait image 10 of digital still image 12 is provided in a digital form, and is stored digitally such as on a floppy disk, memory card, or the like. If image capture device 14 is a photographic film camera, the image is a photographic print captured on photographic paper. Accordingly, the image could be converted to a digital still image (i.e., digital form) using a scanner or other device for converting the image for storage in digital form and generating a digital still image of the photographic print.

Image producing kiosk 16, such as a Picture Maker by Eastman Kodak Company, can include an image capture device for capturing images, or the capturing of an image using an image capture device could be accomplished by the professional photographer at a photo studio or an amateur photographer 18, such as a consumer. An image captured by photographer 18 can be transferred to kiosk 16 using a digital reader (if the image is in digital form) or a scanner (if the image is a photographic print) to convert the photographic print to a digital still image.

Figure 3:
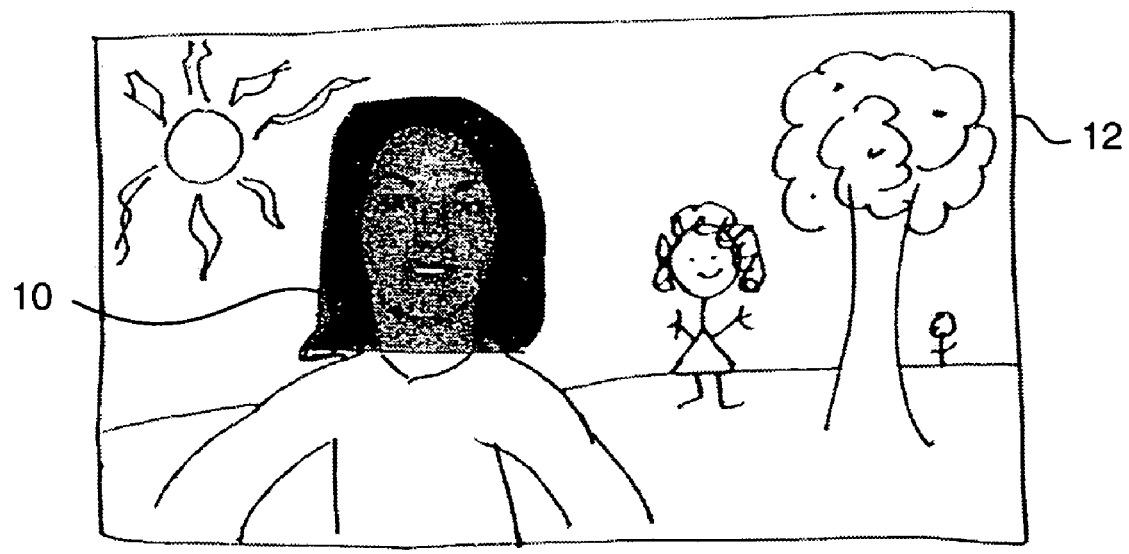
FIG. 3 shows a digital still image comprising the first portrait image of FIG. 2.

Alternatively, all of, or portions of, first portrait image 10 can be extracted from digital still image 12 using known methods. For example, as shown in FIG. 3, first portrait image 10 is one of a plurality of subjects in digital still image 12. More particularly, digital still image 12 includes a portrait portion (i.e., first portrait image 10) and a non-portrait portion. For the particular example of FIG. 3, the non-portrait portion of digital still image 12 includes a flower, a tree, the sun, grass, sky and another person. Known processing methods, such as zoom and crop, can be used to extract first portrait image 10 from digital still image 12. Adobe PhotoShop is an example of a software tool, which may be suitable to extract first portrait image 10 from digital still image 12. Chroma-key technology can also be employed for extracting first portrait image 10 from digital still image 12.

Figure 4:
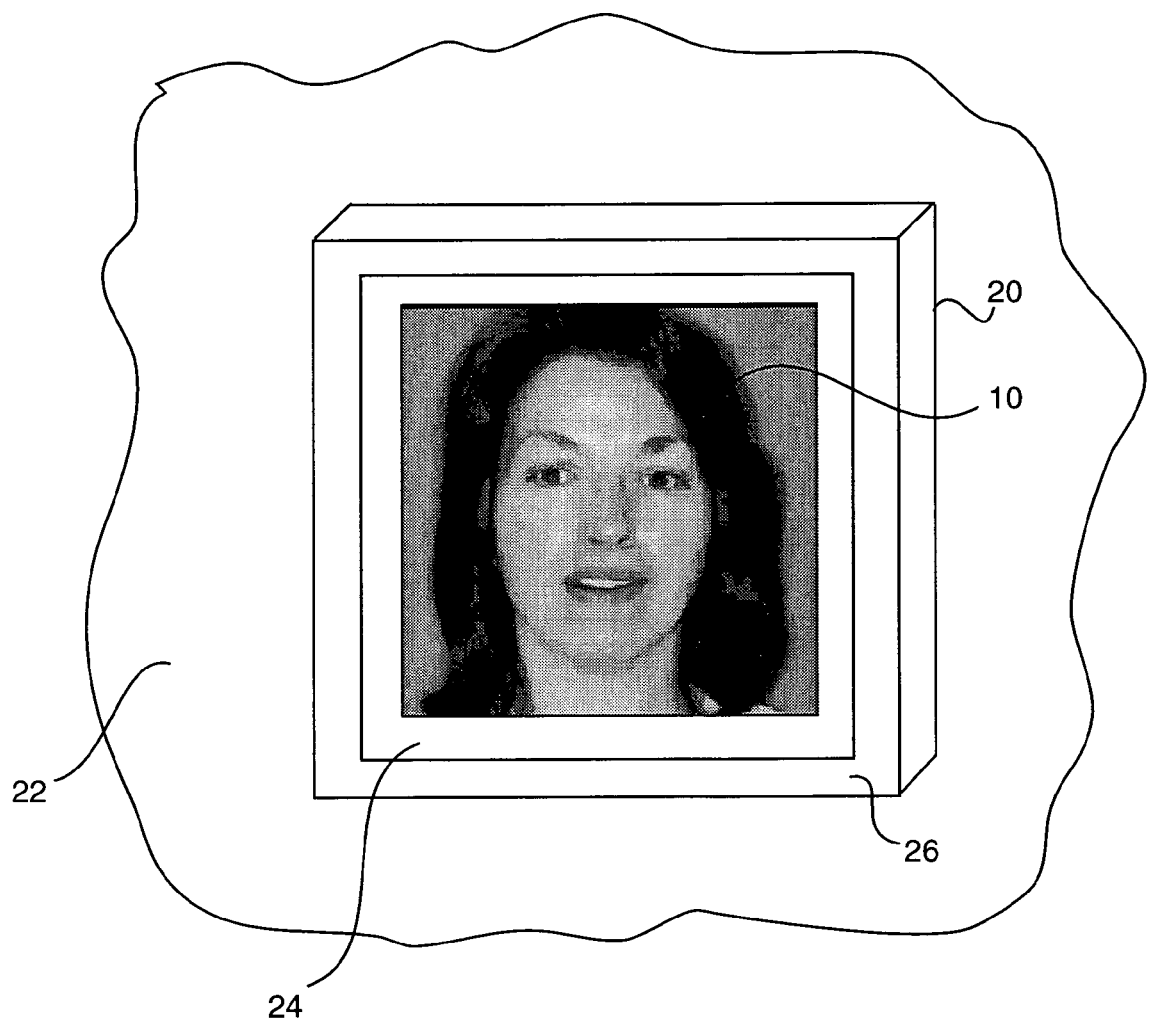
FIG. 4 shows a display disposed within a display area.

Regarding step 100, first portrait image 10 is displayed on a display disposed in a display area, for example, a room in a home, an office, a retail store, or the like. FIG. 4 shows a display 20 including a display screen 24 adapted to display first portrait image 10. Display 20 can include a frame 26 to support display screen 24. Displays which are suitable for displaying a digital still image are well known to those skilled in the art. Examples include flat panel screens, liquid crystal display (LCD) screens, organic light emitting diode screens (OLED), Field Effect Display (FED) screens, digital picture frame, and the like. Display 20 can be configured to be displayed like a conventional picture frame, or hung from a wall or ceiling.

At step 102, a physical stimulus is sensed. As indicated above, a stimulus can be an environmental situation, event, change, time change, audio/sound, temperature, motion, light, or the like. As such, a stimulus can be active or passive. When active, a stimulus can be related to display area 22 in which display 20 is disposed, including but not limited to a change in motion, time (including time of day, day of week, time of year), sound (including voices), or light. For example, a stimulus can include an individual entering display area 22, or the recognition of a voice of a particular individual. When passive, a stimulus is not related to display area 22 in which display 20 is disposed. For example, the stimulus can be related to an area remote from display area 22, the elapse of time (either random or non-random), or an external message transmitted to display 20 over a communication network, such as the internet or the like.

Figure 5:
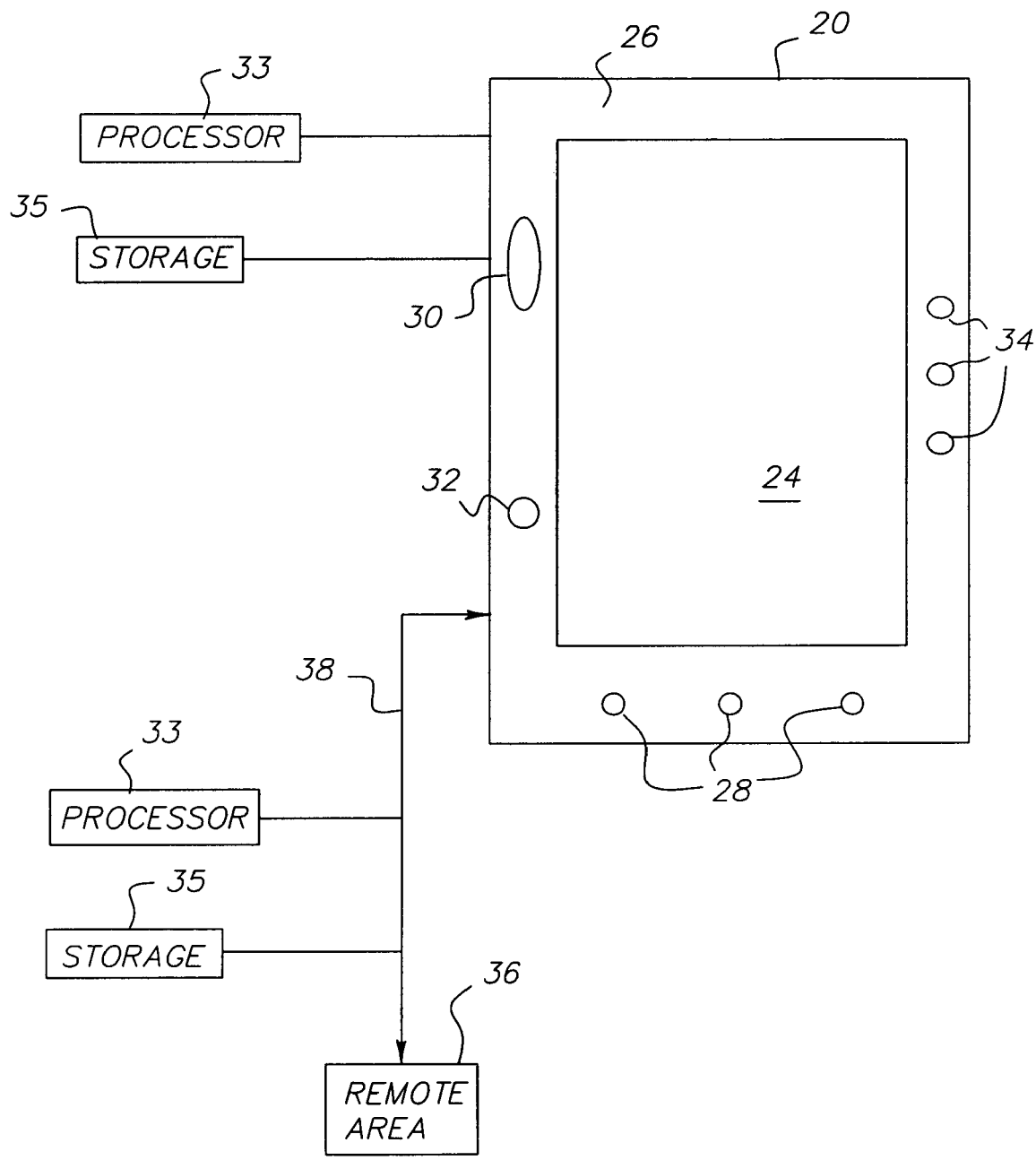
FIG. 5 shows an exemplary display.

Accordingly, display 20 preferably includes features for sensing a stimulus. Referring now to FIG. 5, display 20 preferably includes sensors 28 for sensing a stimulus. Such sensors can be disposed in frame 26 to sense events that are occurring within display area 22. Exemplary sensors include sensors for sensing motion, light, and/or sound. Such sensors are well known to those skilled in the art, and could include a digital image capture device such as a digital video camera. Display 20 can also include a microphone 30 and/or a speaker 32.

It might be desirable, though not required, to have sensors 28, microphone 30, and/or speaker 32 integral to display 20.

If not integral, the sensors, microphone, and/or speaker can be disposed proximate to display 20 in display area 22. An example of a sensor not integral to display 20 is a mat disposed on the ground/floor proximate display 20. Such a mat can be configured to sense weight/pressure to determine the presence/absence of a person within the area of display 20. The modification selected at step 106 can be dependent on the weight/pressure sensed by the mat (e.g., a particular modification when a child is sensed versus a different modification for when an adult is sensed).

As indicated above, a stimulus can be sensed in display area 22, or alternatively a stimulus can be sensed in a remote area 36 remote from display area 22. As will be more particularly described below, a stimulus can be sensed at remote area 36 and transmitted over a communication network 38 to display 20. An example of such a stimulus is a message or instruction transmitted over communication network 38 from a server located at remote area 36. As such, sensors 28, microphone 30, and/or speaker 32 can be disposed at remote area 36.

Display 20 can further include at least one button 34 or other member adapted to access different functions of display 20 by means of a menu. Alternatively, button 34 can provide a link to specific functions. Still further, button 34 can be employed to determine the mode of operation (e.g., active, passive, special program, and the like). Display screen 24 can be a touchscreen adapted to obtain information/data from a user.

Display 20 can further include a processor 33 and a storage device 35 for processing and storing, respectively, the sensed stimulus. Storage device 35 can further include a database of the plurality of modifications and/or be employed to store the generated images. Alternatively, processor 33 and storage device 35 can be located remotely from display 20 and accessed by means of communication network 38. A power supply, such as a power connector or batteries, may be employed to operate the processor and storage device.

As indicated above, a stimulus can be the elapse of time. The elapse of time can be random, such as from a random number generator, or a predetermined period of time. Still further, the elapse of time can be determined by an environmental event. For example, a predetermined time might be one hour until a predetermined threshold of light modifies the predetermined time to 5 minutes. This might reflect the portrait image being in an energy-save mode in the evening when the room is dark, and changing to an active mode when a light is turned on in display area 22.

At step 104, at least one modification is selected responsive to the sensing of the stimulus. That is, once the stimulus is sensed, at least one modification is selected from a plurality of modifications responsive to the sensing of the stimulus.

In one arrangement, the modification can be selected from a series of pre-defined digital still images associated with the first portrait image obtained from a video. That is, a video of the subject of first portrait image 10 can be obtained, and the video compiled into a plurality of digital still images which can be individually selected. The plurality of digital still images can be correlated/associated with a particular categorization or modification. Accordingly, when the stimulus is sensed, at least one of the modifications (i.e., one of the plurality of digital still images) is selected. The selection can be automatic. Once selected, the selected modification is mapped to the first portrait image. For this arrangement, wherein the modifications comprise a series of pre-defined digital still images, the mapping can be accomplished by replacing first portrait image 10 with the selected modification on display 20.

In a second arrangement, the modification can be selected from a series of pre-defined digital still images associated with the first portrait image obtained by individual capture using an image capture device such as a digital camera.

In a third arrangement, the modification can be selected from a plurality of pre-defined modifications such as shown in FIG. 6. That is, a user identifies a pre-defined modification (from the plurality of pre-defined modifications) which is to be mapped to first portrait image 10, a user might use an input device, such as a stylus, keyboard, keypad, touchscreen, or the like, to select one or more pre-defined modifications. The pre-defined modifications can be displayed on display screen 24 for selection by the user, or displayed on another device separate from display 20. For example, in response to the sensed physical stimulus, it might be desired to modify first portrait image 10 to show anger. Accordingly, "anger" would be selected. Alternatively, the pre-defined modifications might be a random set of pre-defined modifications, or a standard set/collection.

For the modification selected using this third arrangement, mapping the selected at least one modification to first portrait image 10 can be accomplished using techniques known to those skilled in the art, such as disclosed by (1) "Synthesizing Realistic Facial Expressions from Photographs", by Pighin et al, SIGGRAPH 98, Computer Graphics Proceedings, Annual Conference Series, 1998, Pages 75–83, which discloses a technique of modeling a facial image and providing smooth transitions between facial expressions; (2) LifeFX, Inc., which utilizes a model of a facial image (refer to "You've Got Face!", Time, Apr. 2, 2001, page 77.); (3) "A Morphable Model for the Synthesis of 3D Faces", Volker Blanz and Thomas Vetter, Max Planck Institute, SIGGRAPH Computer Graphics Proceedings, Annual Conference Series, 1999, pages 187–194; (4) "A muscle model for animating three-dimensional facial expression" by Keith Waters, Computer Graphics (SIGGRAPH 1987), Vol 21, PP. 17–24, July 1987 which provides a muscle based approach; (5) "Making Faces", by Guenter et al, Computer Graphics (SIGGRAPH 1998), pp 55–56, August 1998 which provides an empirical approach; or (6) "Realistic face modeling and animation" by Y. C. Lee et al, Computer Graphics (SIGGRAPH 1995) pp. 55–62, August 1995.

Stated generally, an image model is generated, and the selected modification is applied to the image model to generate a second digital still portrait image.

Figure 7:
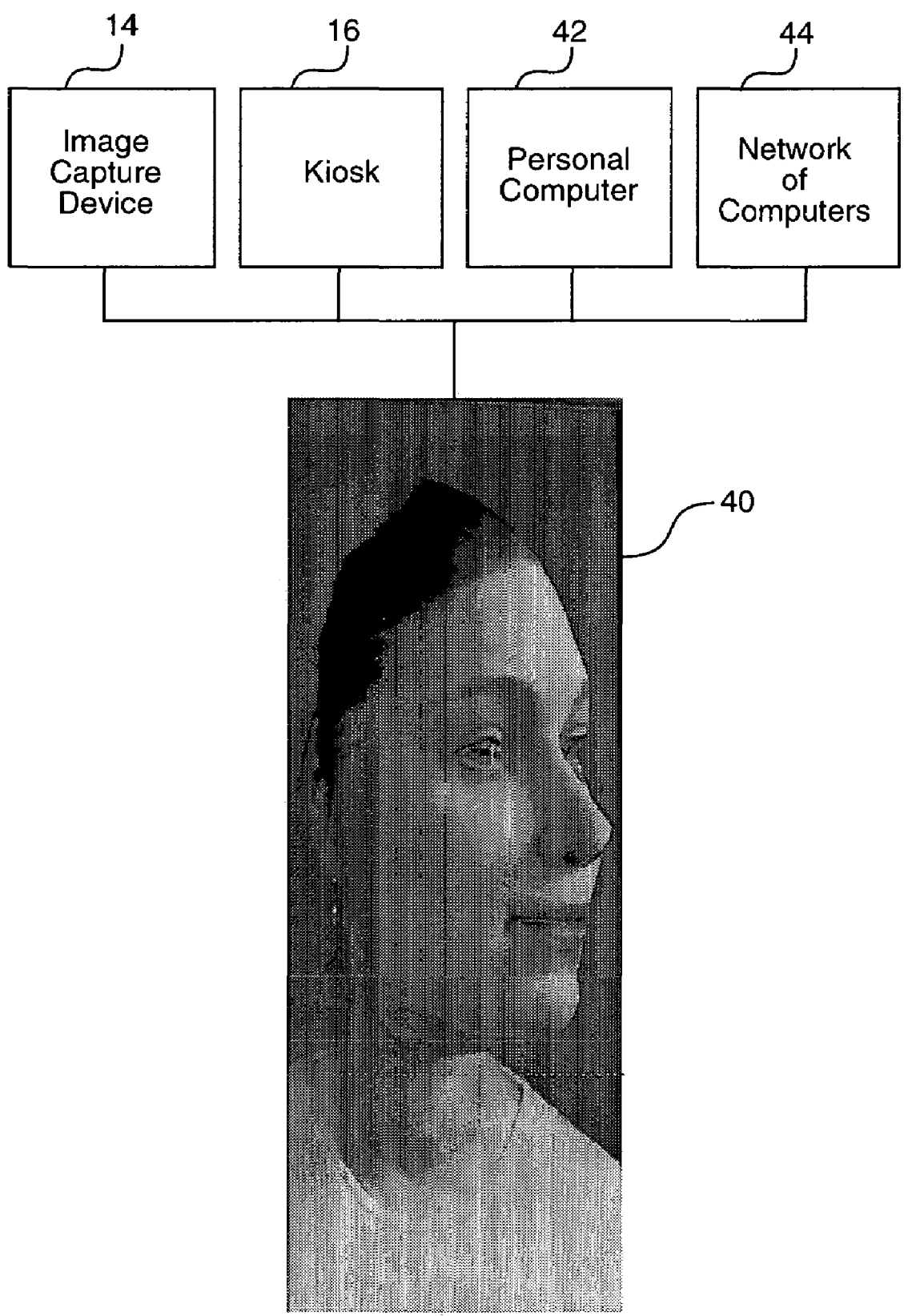
FIG. 7 shows an isometric view of a 2.5 dimensional image model of the first portrait image of FIG. 2.

An example of an image model generated from a portrait image is illustrated in FIG. 7 as image model 40. For ease of explanation, FIG. 7 is shown in an isometric view. As illustrated, image model 40 is a 2.5 dimensional (i.e., a two and one half dimensional) model. That is, since the model was generated using a planar (i.e., 2-dimensional) image, a 3-dimensional model could not be generated since the exact information on parts of the head that are not in the photograph could not be determined. However, a partial model could be created from the planar image which provides for limited movement of the portrait image yet contains more than 2 dimensions of information. The model is therefore referred to as a 2.5 dimensional model. However, as known to those skilled in the art, multiple images can be combined to generate a full 3-dimensional model.

It is recognized that in capturing first portrait image 10, a threshold level of resolution may be required to generate a realistic image model of the portrait image. This threshold level of resolution may be defined/identified by those skilled in the art of facial animation, and may be dependent on the technique used to generate the model.

The generation of image model 40 can be accomplished by image capture device 14, if image capture device 14 includes an image processing unit. Image producing kiosk 16 could also produce image model 40. Alternatively, image model 40 could be generated by at least one personal computer 42, using a communications network, by a network of computers 44, or the like.

Figure 8:
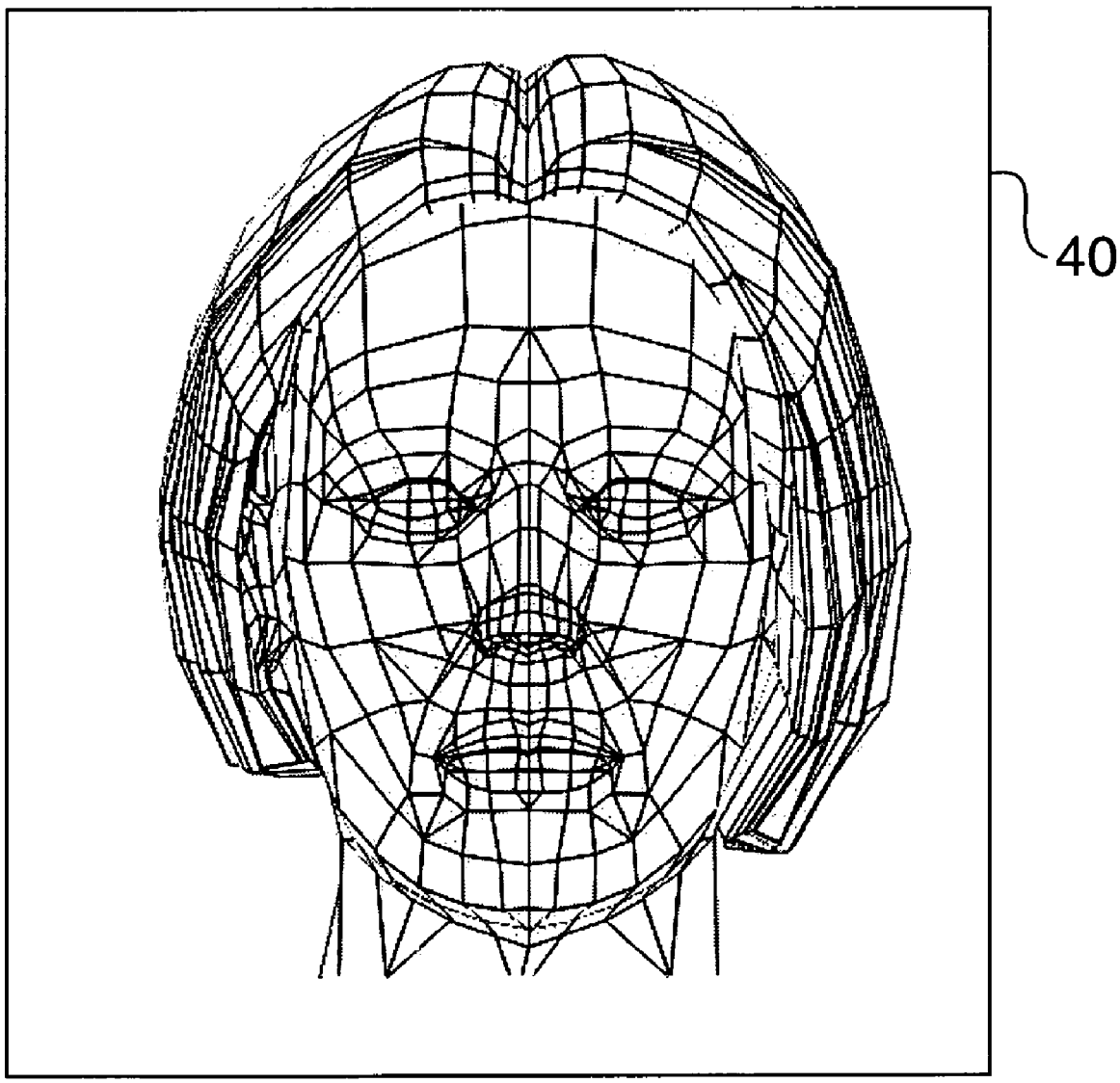
FIG. 8 shows a wire frame model which is the basis of the image model of FIG. 7.

FIG. 8 illustrates a wire frame model of image model 40 used as a basis for modeling first portrait image 10. As illustrated in FIG. 8, image model 40 may include a portrait model portion and a non-portrait model portion. For example, the portrait model portion may comprise the face and head whereas the non-portrait model portion may comprise a neck, shoulders, arms, or a background.

Figure 9:
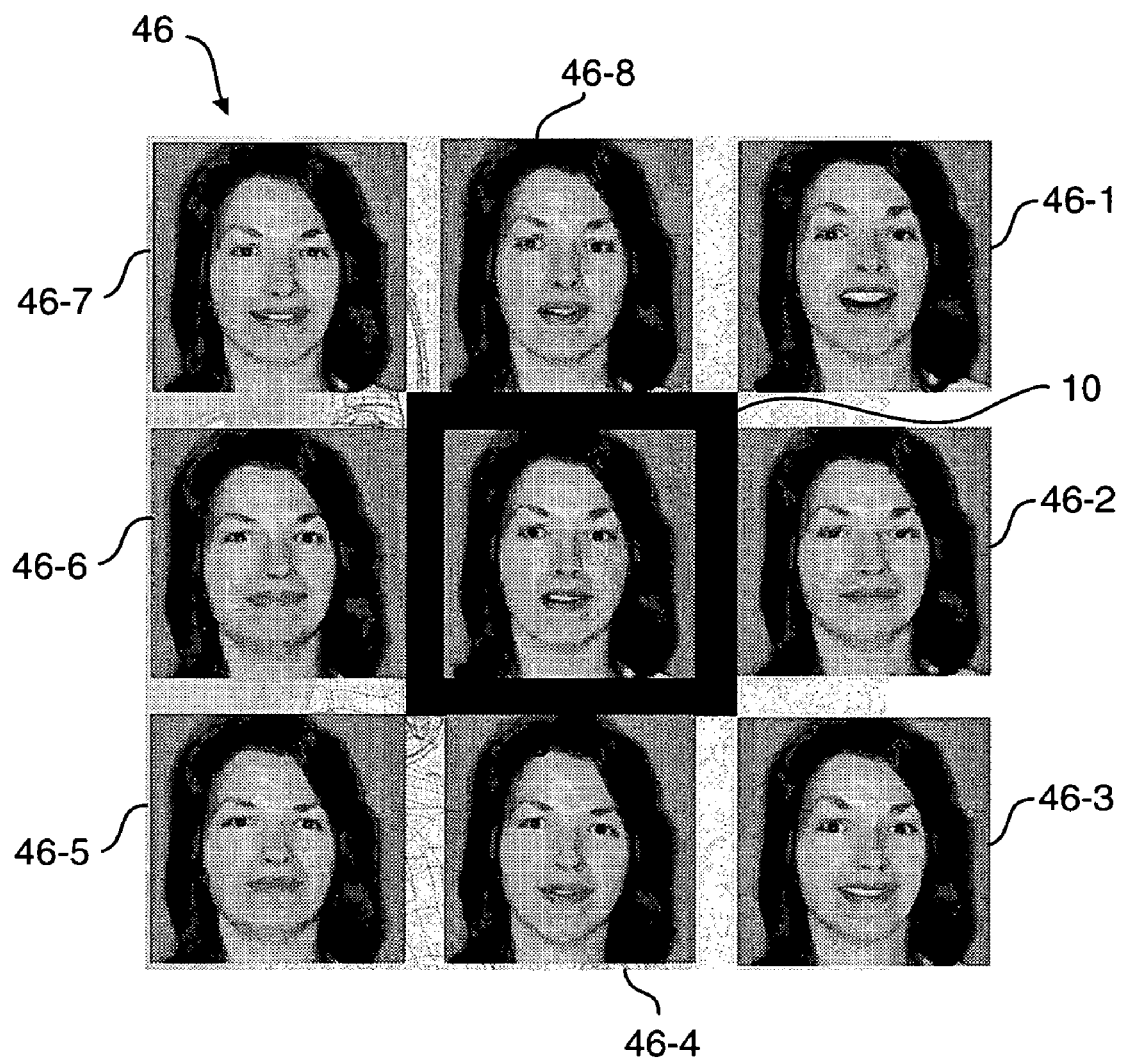
FIG. 9 shows a plurality of second portrait images generated using the method of the present invention.

The selected pre-defined modification is applied to image model 40 at step 104 to generate a second digital still portrait image, which is displayed at step 108 on display 20. For example, referring again to FIG. 6, if a user selects a pre-defined modification of "happy", the pre-defined modification is mapped/applied to image model 40 to generate a second portrait image as shown in FIG. 9 as modified portrait image 46-1. The mapping/application to generate the second portrait image can be accomplished by an image processing unit in display 20, or by employing a remote device such as image capture device 14, image producing kiosk 16, personal computer 42, network of computers 44, or the like.

FIG. 9 illustrates an example of a plurality of second portrait images 26 which have been generated using image model 40. More particularly, FIG. 9 shows eight second portrait images 46-1 through 46-8, each having been generated from different selected modification selected from the plurality of pre-defined modifications shown in FIG. 6. Each second portrait image 46-1 through 46-8 represents a modification in first portrait image 10 (first portrait image 10 being displayed in the center for illustrative purposes only). For FIG. 9, each modified portrait image 46-1 through 46-8 provides a modification in emotion. For example, second portrait image 46-1 provides an emotion of surprise, while second portrait image 46-8 provides an emotion of calm. Some modifications can provide an emotion which may be subtle and not easily discernable from another emotion.

The plurality of modifications can be retrieved from an existing database stored locally or remotely. The database may have been previously cataloged.

Figure 10:
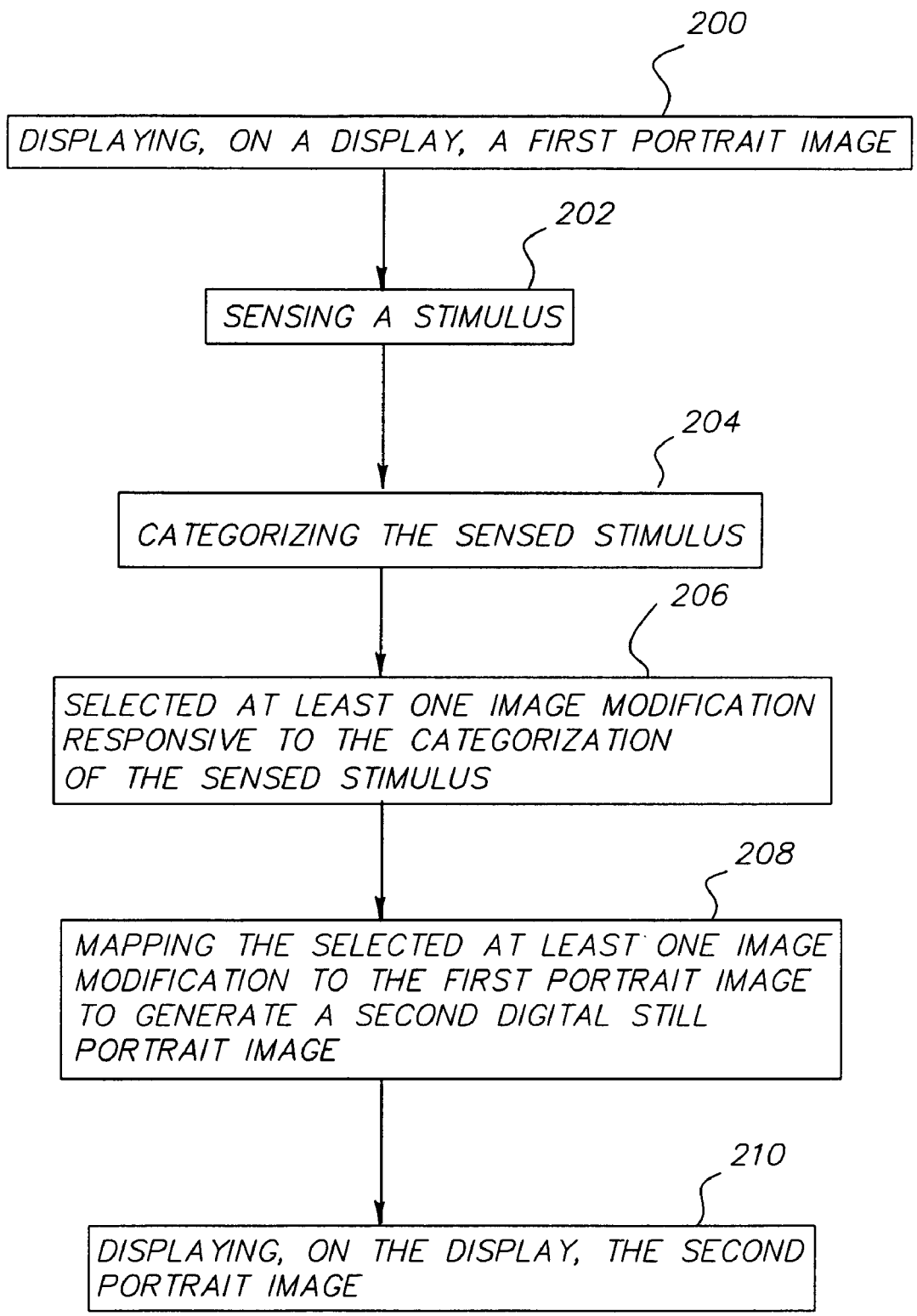
FIG. 10 shows a flow diagram illustrating another method in accordance with the present invention.

In another embodiment, the stimulus is categorized after being sensed, and the modification is selected responsive to the categorization. That is, the categorization allows for the indication of how to modify portrait image 10. A flow diagram of a method in accordance with this embodiment of the present invention is shown in FIG. 10. The portrait image is a digital still image, and is displayed on display 20 disposed in display area 22 (step 200). A physical stimulus is sensed (step 202) and categorized (step 204). At step 206, least one modification is selected responsive to the categorization of the sensed stimulus. The selected at least one modification is mapped to the portrait image to generate a second digital still portrait image (step 208). The second portrait image is then displayed on the display (step 210). Steps 202 through 208 can be repeated to generate further portrait images (i.e., a third portrait image, a fourth portrait image, a fifth portrait image), which can then each be displayed on the display at step 210.

The categorization allows for the modifications to the portrait image to represent a particular, perhaps realistic, response to a sensed stimulus. The categorization can comprise a database including one or more categories. For example, an expression category can include different variants of a given expression. Smiles could be disposed in one of the expression categories with different type of smiles (e.g., toothy grin, lips shut smile) being disposed in this category. These personalized expressions can be captured when portrait image 10 is captured. Alternatively, the expressions can be extracted from a general generic database of expressions captured from various sources or idealized expressions generated by empirical means. The generic expressions may need to be transformed so as to conform to portrait image 10.

Categorization of the sensed stimulus can correlate to a realistic expectation of a response from a human being under similar circumstances. FIG. 11 provides a table of possible categorization of sensed stimulus and candidate modifications. For example, if a loud (amplitude), sharp (high frequency content) sound is sensed, the correlated expectation is an expression of "surprise". A large change in ambient light could cause the portrait image to squint, blink or "wake up". Similarly, sensing a familiar voice might cause the portrait image to become attentive, comfortable (e.g., dilated pupils, smile, blink, friendly expression, etc.)

In a further embodiment, the plurality of pre-defined modifications is provided in an existing database, which is accessible. That is, first the plurality of pre-defined modifications is provided. Then, when the stimulus is sensed, at least one of the plurality of pre-defined modifications is selected in response to the stimulus. A modified portrait image is generated using the selected at least one of the plurality of pre-defined modification. This modified portrait image, i.e., the second portrait image, can then be displayed on display 20.

In yet another embodiment, a plurality of modified portrait images are generated prior to the sensing of the stimulus. That is, image model 40 is generated from first portrait image 10. A plurality of pre-defined modifications is provided, whereby each of the plurality of pre-defined modifications is applied to image model 40 to generate a plurality of modified portrait images. Then, when a stimulus is sensed, one of the plurality of modified portrait images is selected for display on display 20.

Figure 12:
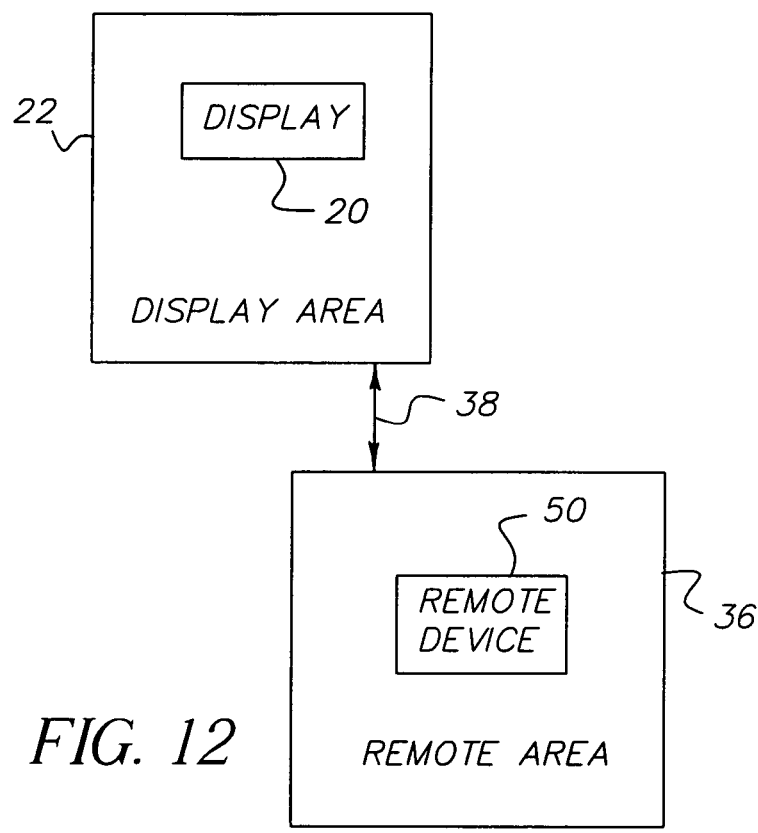
FIG. 12 shows a display in communication with a remote device.

As indicated above, a stimulus can be sensed in remote area 36 remote from display area 22 and transmitted over communication network 38 to display 20. Accordingly, referring now to FIG. 12, a remote device 50 can be employed to sense a stimulus in remote area 36. Remote device 50 can be a display having sensors (i.e., configured such as display 20) for sensing the stimulus. For example, remote device 50 can sense a baby crying at remote area 36, wherein the alarming sound (i.e., crying) would be categorized, and a "sadness" modification would be mapped to the subject of first portrait image 10 of display 20 located in display area 22.

Alternatively, a stimulus sensed at remote area 36 can be configured as a message, text, or instruction and transmitted over communication network 38 from remote device 50 to display 20. As such, remote device 50 can be configured as a computer, telephone, personal digital assistant (PDA), wireless communication device, remote control, or the like which includes buttons or other members for inputting message/instructional/textual information. For example, a person located at remote area 36 can employ remote device 50 to indicate "activation" (such as pressing an "activation" button on remote device 50) wherein the categorization of "waking" would be associated and the modification of "alertness" would be mapped to the subject of first portrait image 10. In another example, a person located at remote area 36 can employ remote device 50 to type in "bring home milk" wherein the categorization of "random" can be associated and the modification of "alert" would be mapped to the subject of first portrait 10 and the message of "bring home milk" would also appear on the image area of display 20. In a further example, an emotion of a person located at remote area 36 can be entered/transmitted over communication network 38 whereby display 20 displays that transmitted emotion (i.e., the person at remote area 36 enters "happy" to remote device 50 and display 20 is responsive). As such, the viewer of display 20 can understand the emotion/activity of the person located at remote area 36.

Alternatively, a "remote" device/control, such as a handheld device similar to a remote control of a television, can be employed to trigger/activate a physical stimulus. The remote control can include buttons or other members to transmit a signal representative of a physical stimulus. For example, the remote control can include input means to specify a stimulus, such as a "lights on" or "lights off" button which transmit a corresponding signal to display 20. Alternatively, the remote control can include input means to activate a specific response. For example, the remote control can include a "sad" button or a "smile" button, whereby a signal is transmitted to display 20 to activate that response. This activation by the remote control could over-ride or augment another physical stimulus being sensed.

Figure 13:
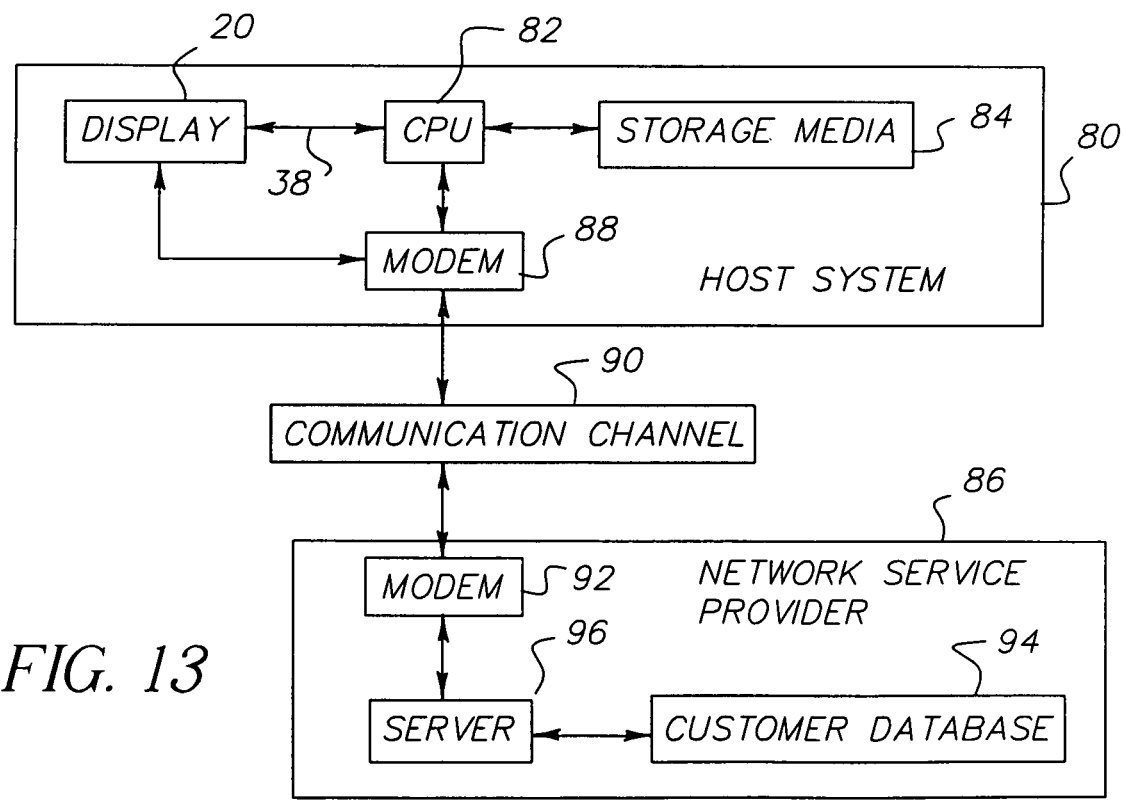
FIG. 13 shows a system which can be employed to accomplish the method of the present invention.

FIG. 13 illustrates one embodiment of a system which can be employed to practice the method in accordance with the present invention. System 80 includes a processing unit 82, such as a computer or the like to accomplish the method of the present invention. System 80 includes display 20 in communication by means of communication network 38 to processing unit 82. A storage medium 84 can be provided to store data needed for accomplishing the method of the present invention. Storage medium 84 are known to those skilled in the art, and can include one or more devices such as RAM, ROM, hard drive, floppy drive, CD, and the like.

Alternatively, processing unit 82 and storage medium 84 can reside on a remote system 86 remote from system 80. That is, if system 80 includes a communication means 88 (such as a modem or internet connection), system 80 can communicate with remote system 86 by means of a communication network 90. Remote system 86 would also include a communication means 92 for communicating with communication network 90 to a server 96. Remote system can also include a customer database 94 for storing data needed to accomplish the method of the present invention. Remote system 86 might be operated by a service provider, retailer, or other party.

It is recognized that special effects can be applied to portrait image 10 as it is displayed on display 20. For example, filters can be employed to change the appearance of portrait image to that of a rendering by an artist. Examples of such filters are digital image processing algorithms that modify the appearance of the image to simulate an oil painting, watercolor, charcoal sketch, or the like. Changing the effect of the portrait image can be a modification which is responsive to a stimulus.

When a particularly pleasing portrait image is viewed on display 20, display 20 can be configured to store and/or transmit that particular image.

It is noted that first portrait image need not be a realistic representation of a subject. That is, first portrait image can be a non-photo realistic image of a subject, such as a cartoon, caricature, rendering, or the like. Further, rather than displaying a photo-realistic image, the system of the present invention could render the image using painterly effect filters to provide the image with an appearance of being created by an artist. Examples of painterly effect filters are digital image processing algorithms that modify the appearance of the image to simulate an oil painting, watercolor, charcoal sketch, and the like. Changing the painterly effect can also be a response to a stimulus.

Examples are now provided.

FIRST EXAMPLE

Figure 14:
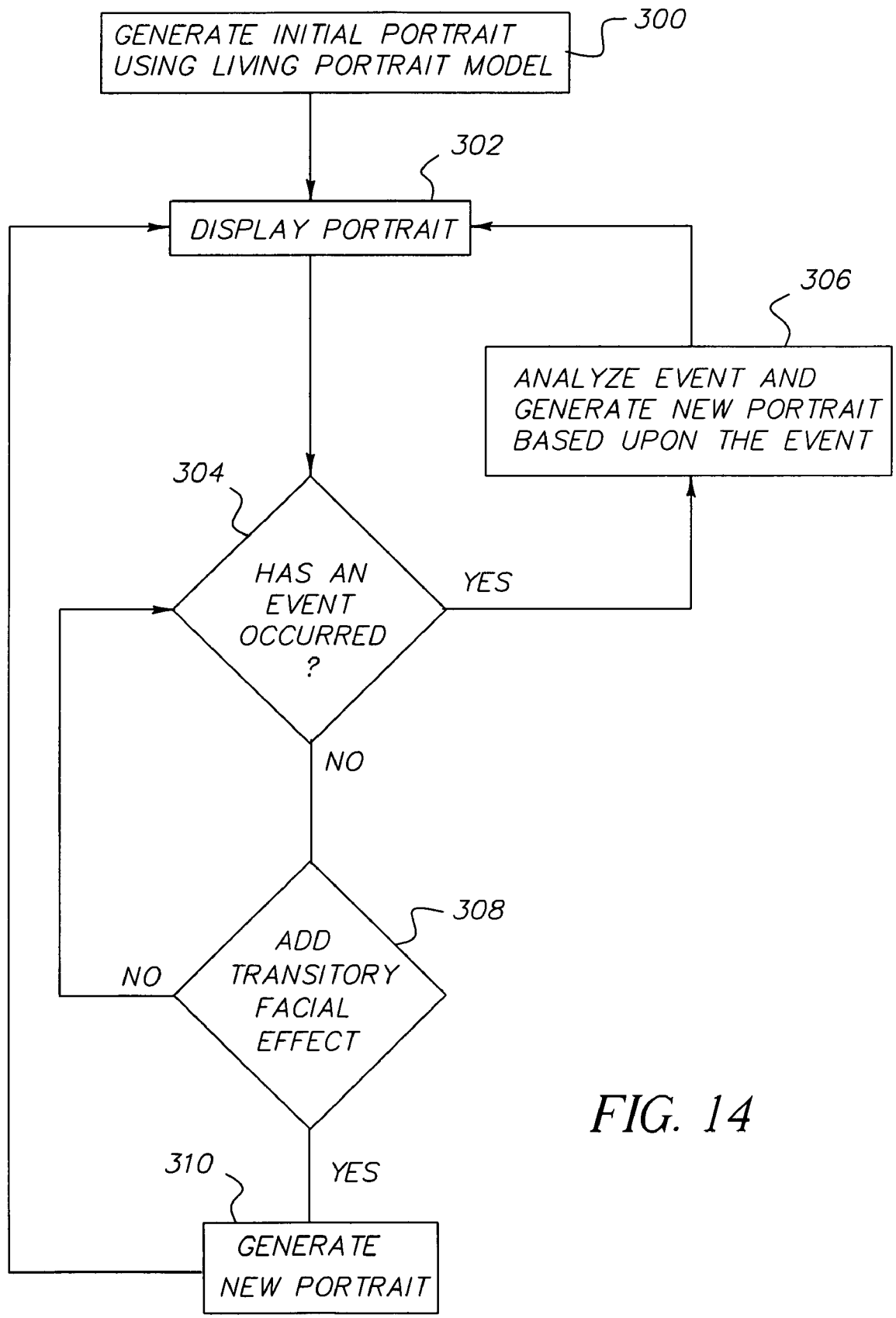
FIG. 14 shows a flow diagram illustrating a method in accordance with the present invention.
Figure 15A:
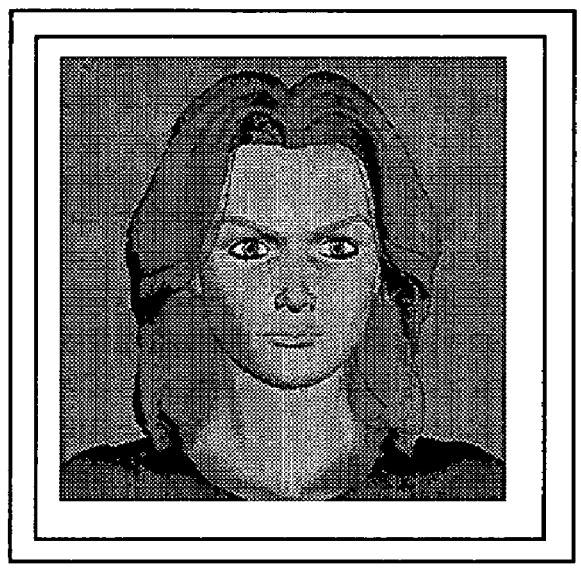
FIGS. 15a–15c show exemplary portrait images.
Figure 15B:
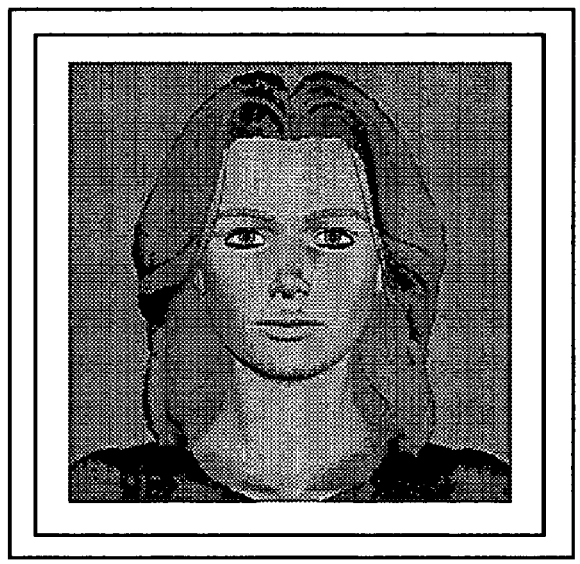
Figure 15C:
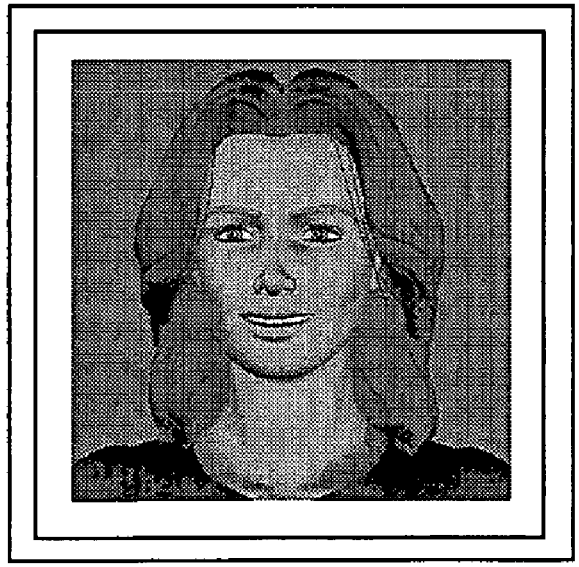

System 80 can operate in a passive mode of operation wherein display 20 responds only to time events. In this mode, the modification (e.g., expression/pose) of the subject of portrait image 10 would change based on the lapse of a specified period of time. In a preferred embodiment, the time period for the modification would be on the order of hours. That is, the modification of portrait image 10 would occur so slightly as to not be perceivable by a viewer. As such, the probability of a viewer seeing a change in portrait image 10 would be low. The long time period enables a viewer to savor the salient features of the portrait image, and not be distractive to the viewer of the portrait image. It would be as if someone had removed the picture from the frame while the viewer was gone, and replaced the picture with one that was subtly different than the previous picture. The time period for the modification could be modified by the viewer to enable a preferred operation. Referring now to FIG. 14, display 20 is activated (step 300) whereby portrait image 10 is displayed in display 20 located in display area 22 (step 302). A decision loop is entered waiting for a stimulus (step 304). For this example, the stimulus is a predetermined period of time. When the event occurs, system 80 analyzes the stimulus (step 306) and generates a second portrait image for display on display 20. If the predetermined period of time has not occurred (step 308), system 80 can determine whether to add a transitory effect to the displayed portrait image, such as the blinking of an eye, a moving of an eye, eye tracking, or a moving/tilting of a head (step 308). If a transitory effect is added, a new portrait image is generated (step 310) and displayed on display 20 (step 302). It is noted that the lapse of time can be variable. For example, referring to FIGS. 15*a* through 15*c*, FIG. 15*b* shows an exemplary portrait image illustrating a transitory effect which can be provided to intermediate the portrait images shown in FIGS. 15*a* and 15*c*. When the series of portrait images shown in FIGS. 15*a* through 15*c* are displayed on display 20, the modifications between each portrait image of the series is subtle, to be almost indiscernible by a viewer.

SECOND EXAMPLE

In one embodiment, the portrait image displayed on display 20 can be refreshed immediately upon the sensing of a stimulus. In another embodiment, the portrait image displayed on display 20 can be incremented over time to the new portrait image such that the portrait image appears to be moving. Using the "current" portrait image and "next" portrait image as keyframes, processing unit 82 can generate portrait images intermediate the "current" and "next" portrait images which would be incremental to reaching the "next" portrait image. Once the "next" portrait image is reached, this portrait image would be displayed on display 20 until another stimulus is sensed.

THIRD EXAMPLE

If sensor 28 is a motion sensor, portrait image 10 can be activated when sensor 28 senses motion within display area 22. For example, upon sensor 28 sensing a motion within display area 22, a new portrait image 10 is generated for display on display 20. The activity would cease or be reduced when sensor 28 no longer senses motion within display area 22. Similarly, if sensor 28 is a light sensor, portrait image 10 can be activated when sensor 28 senses light within display area 22. Likewise, if sensor 28 detects sound, portrait image 10 can be activated when sensor 28 senses sound.

FOURTH EXAMPLE

If sensor 28 is a digital image sensor (e.g., a digital video camera), it can be adapted to recognize objects, such as face recognition. Then, sensor 28 can recognize who is the viewer viewing display 20 in display area 22. If the viewer is recognized, display 20 can be configured to respond appropriately to the viewer. For example, if a mother is recognized as the viewer, the modification selected for mapping to the portrait image (for display on display 20) can be of a smile. Or, if a father is recognized, the modification selected for mapping to the portrait image (for display on display 20) can be of a wave. Similarly, if the viewer is recognized, a facial expression of the viewer can be analyzed to determine the current emotional state of the viewer, such that an appropriate modification is to be selected for mapping to the portrait image. For example, if a mother is recognized, and her facial expression is analyzed to be a happy expression, an appropriate audio message can be selected for mapping, such as "I love you Mom". If the mother is recognized and her facial expression is analyzed to be sad, the modification selected for mapping can be of a sad expression, to match that of the viewer.

FIFTH EXAMPLE

As shown in FIG. 5, display 20 can be in communication with remote area 36 such that a stimulus can be sensed at remote area 36 and transmitted over a communication network 38 to display 20. Such a stimulus is a message or instruction transmitted over communication network 38 from a server located at remote are 36. For example, display 20 is activated within display 22 when motion is detected within remote area 36. A parent located at the office having display 20 on their desk (i.e. display area 22) can determine when their child, located at home (i.e., remote area 36) is moving around the house by looking at display 20 and assessing when the portrait image is changing.

SIXTH EXAMPLE

The method of the present invention can be employed to serve as a one-way communication device to deliver a message from an individual located at remote area 36. For example, a husband displays a portrait image of his wife on display 20 at his office (i.e., display area 22). Display 20 is in communication by means of communication network 38 to his home (i.e., remote area 36). A corresponding system disposed at the house can be configured to allow a message to be sent to the office from his wife in the form of a recorded audio message file which can be played through speaker 32 on display 20. In a preferred embodiment, the sound file is used to drive lip synchronization of the portrait image. Alternatively, rather than an audio file, a text message can be transmitted and the message displayed on a display area of display screen 24. A text-to-speech converted could be employed to convert the text to audio that can be played through speaker 32 or used to drive the lip synchronization of the portrait image.

SEVENTH EXAMPLE

The facial expression of a subject of first portrait image 10 can serve as an indicator for the current emotional state of the subject of first portrait image 10. That is, if display 20 (displaying an image of the subject) is connected to remote device 50, and the subject of first portrait image 10 is located at remote area 36, the subject can transmit a message/signal to display 20 indicating their current mood/emotional state (e.g., happy, busy, romantic). This would signal display 20 to activate and modify the pose/expression to that which represents the transmitted message/signal. The transmission of the message/signal can be accomplished by remote device 50, or other device for communicating with display 20. For example, a spouse at home can signal to their spouse at an office their current mood/emotional/activity state, such as hectic or romantic.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

| | |
|---|---|
| 10 | first portrait image |
| 12 | digital still image |
| 14 | image capture device |
| 16 | kiosk |
| 18 | professional photographer/consumer |
| 20 | display |
| 22 | display area |
| 24 | display screen |
| 26 | frame |
| 28 | sensors |
| 30 | microphone |
| 32 | speaker |
| 33 | processor |
| 34 | buttons |
| 35 | storage device |
| 36 | remote area |
| 38 | communication network |
| 40 | image model |
| 42 | personal computer |
| 44 | network of computers |
| 46-1–46-8 | modified portrait image |
| 50 | remote device |
| 80 | system |
| 82 | processing unit |
| 84 | storage medium |
| 86 | remote system |
| 88 | communication means; modem; internet |
| 90 | communication network |
| 92 | communication means; modem; internet |
| 94 | customer database |
| 96 | server |

What is claimed is:

1. A method for modifying a digital still portrait image displayed on a display disposed in a display area to affect emotion of the portrait image, comprising the steps of:
   sensing a physical stimulus;
   selecting at least one modification that affects emotion from a plurality of pre-defined modifications that affect emotion in response to the sensing of the physical stimulus;
   mapping the selected at least one modification that affects emotion to the portrait image to generate a modified digital still portrait image; and
   displaying, on the display, the modified portrait image.

2. The method of claim 1, further comprising the step of categorizing the sensed stimulus prior to selecting the at least one modification, and the physical stimulus is a non-time based physical stimulus.

3. The method of claim 2, wherein the at least one modification is automatically selected responsive to the categorization of the sensed stimulus.

4. The method of claim 1, wherein the stimulus is a non-time based stimulus and is sensed in the display area.

5. The method of claim 1, wherein the stimulus is a non-time based stimulus and is sensed in an area physically remote from the display area.

6. The method of claim 1, wherein the stimulus is an elapse of time.

7. The method of claim 6, wherein the elapse of time is random.

8. The method of claim 6, wherein the elapse of time is predetermined.

9. The method of claim 6, wherein the elapse of time is determined by an environmental event.

10. The method of claim 1, wherein the sensing is non-time based physical stimulus and is accomplished by a light sensor, a motion sensor, a weight sensor, a proximity sensor, a temperature sensor, a remote device, or an audio sensor.

11. The method of claim 1, wherein the step of mapping comprises the steps of:
selecting the at least one modification from a plurality of pre-defined modifications;
generating an image model; and
applying the selected at least one modification to an image model of the first portrait image to generate the second portrait image.

12. The method of claim 1, wherein steps of sensing, categorizing, selecting, mapping, and displaying are repeated.

13. The method of claim 1, wherein the selected one of the plurality of modifications modifies the first digital still portrait image for aging, pose, expression, texture, weight, beauty, non-photo realistic effects, eye movement, or hair loss or gain.

14. A method of modifying a digital still portrait image, comprising the steps of:
(a) providing a plurality of pre-defined modifications that affect emotion;
(b) displaying, on a display in a display area, the portrait image;
(c) sensing a physical stimulus;
(d) selecting at least one of the plurality of pre-defined modifications that affect emotion in response to the sensing of the stimulus;
(e) generating a modified portrait image using the selected at least one of the plurality of pre-defined modifications; and
(f) displaying, on the display, the modified portrait image.

15. The method of claim 14, wherein the step of generating comprises the steps of:
generating an image model of the portrait image; and
applying the selected at least one pre-defined modification to the image model to generate the modified portrait image.

16. The method of claim 14, wherein the plurality of pre-defined modifications that affect emotion comprises a series of digital still images, and the step of generating comprises the step of replacing the portrait image with the selected at least one modification.

17. The method of claim 14, further comprising the step of categorizing the sensed stimulus prior to selecting the at least one pre-defined modification.

18. The method of claim 17, wherein the at least one pre-defined modification is selected responsive to the categorization of the sensed stimulus.

19. The method of claim 14, wherein the stimulus is sensed in the display area.

20. The method of claim 14, wherein the stimulus is sensed in an area remote from the display area.

21. The method of claim 14, wherein the stimulus is an elapse of time.

22. A method of modifying a digital still portrait image, comprising the steps of:
(a) generating an image model of the portrait image;
(b) providing a plurality of modified portrait images generated by applying a plurality of pre-defined modifications to the image model that affect emotion;
(c) displaying, on a display in a display area, the portrait image;
(d) sensing a non-time based physical stimulus;
(e) selecting at least one of the plurality of modified portrait images in response to the non-time based physical stimulus; and
(f) displaying, on the display, the selected at least one of the plurality of modified portrait images.

23. The method of claim 22, further comprising the step of categorizing the sensed stimulus prior to selecting the at least one pre-defined modification.

24. The method of claim 23, wherein the at least one pre-defined modification is selected responsive to the categorization of the sensed stimulus.

25. The method of claim 22, wherein the stimulus is sensed in the display area.

26. The method of claim 22, wherein the stimulus is sensed in an area remote from the display area.

27. A method of displaying a plurality of images on a display located in a display area, comprising the steps of:
displaying a first digital still portrait image on the display;
determining a predetermined period of time;
selecting at least one modification affecting emotion from a plurality of pre-defined modifications affecting emotion and mapping the selected at least one modification to the first digital still portrait image to generate a second digital still portrait image;
determining a transitory modification and mapping the selected transitory modification to the first portrait image to generate a transitory digital still portrait image;
displaying on the display, prior to the elapse of the predetermined time, the transitory digital still portrait image; and
displaying on the display, in response to the elapse of the predetermined time, the second digital still portrait image.

28. An image display for displaying a plurality of digital still portrait images, comprising:
a sensing member for sensing a physical stimulus, wherein the sensing member is a light sensor, a motion sensor, a weight sensor, a proximity sensor, a temperature sensor, or an audio sensor;
a storage device for storing a plurality of pre-defined modifications affecting emotion;
a processor for categorizing the sensed stimulus, selecting at least one modification affecting emotion from the plurality of pre-defined modifications affecting emotion in response to the sensing of the physical stimulus, and mapping the selected at least one modification to a first portrait image to generate another digital still portrait image; and
an image display for displaying the another digital still portrait image generated in response to the sensing of the stimulus.

29. The method of claim 28, wherein the plurality of pre-defined modifications further include aging, pose, expression, texture, weight, beauty, non-photo realistic effects, eye movement, or hair loss or gain.

30. A system for displaying a plurality of digital still portrait images to simulate a living portrait, comprising:
(a) an image display located at a first location, the image display including a display area for displaying, individually, each of the plurality of digital still portrait images;
(b) a remote device disposed at a location physically remote from the first location and including either a sensing member for sensing a non-time based physical stimulus at the remote location or a receiving member for receiving a non-time based stimulus at the remote location;

(c) a communication network for providing communication between the image display and the remote device;

(d) a storage device for storing a plurality of pre-defined modifications; and (e) a processor for receiving and categorizing the stimulus from the remote device, selecting at least one modification from the plurality of pre-defined modifications in response to the sensing of the physical stimulus, mapping the selected at least one modification to a first portrait image to generate another digital still portrait image, wherein the generated another digital still portrait image is displayed on the image display.

31. The method of claim 30, wherein the sensing member is a light sensor, a motion sensor, a weight sensor, a proximity sensor, a temperature sensor, or an audio sensor.

32. The system of claim 30, wherein the remote device is configured as a computer, telephone, personal digital assistant (PDA), wireless communication device, or remote control.

33. The system of claim 30, wherein the receiving member is adapted to receive an input, message, instruction, or text.

34. A system for controlling a display of a digital still portrait image, comprising:
(a) an image display including a display area for displaying at least one digital still portrait image;
(b) a control device, separate from the display, including at least one member actuatable by a user to generate a signal representative of a non-time based stimulus;
(c) communication means for transmitting the signal from the control device to the image display;
(d) a storage device for storing a plurality of pre-defined emotion affecting modifications; and
(e) a processor for receiving the signal from the control device, selecting at least one modification from the plurality of pre-defined modifications to affect emotion of the portrait image in response to receiving the signal, mapping the selected at least one modification to a first portrait image to generate another digital still portrait image, wherein the generated another digital still portrait image is displayed on the image display.

35. A method of displaying an image on a display, comprising the steps of:

displaying, on the display, a first digital still portrait image;

providing a control device, separate from the display, including at least one member physically actuatable by a user to generate a signal representative of a stimulus;

receiving the signal from the control device;

selecting at least one modification affecting emotion from a plurality of pre-defined modifications affecting emotion in response to receiving the signal, mapping the selected at least one modification to the first portrait image to generate a second digital still portrait image; and displaying, on the display, the second portrait image.

* * * * *